3,270,017
METHOD FOR PRODUCING STABLE SALTS OF DICHLOROISOCYANURIC ACID

Stephen J. Kovalsky, Scotch Plains, and Raymond A. Olson, Westfield, N.J., assignors to FMC Corporation, New York, N.Y., a corporation of Delaware
No Drawing. Filed June 17, 1964, Ser. No. 375,934
11 Claims. (Cl. 260—248)

This invention relates to an improvement in the production of salts of dichloroisocyanuric acid and more particularly, to the large scale production of salts of dichloroisocyanuric acid which have the same high degree of stability against decomposition which is obtainable by ordinary small scale operations.

In this application, the term "salts of dichloroisocyanuric acid" is intended to cover all salts of dichloroisocyanuric acid regardless of the tautomeric form in which they may exist.

Salts of dichloroisocyanuric acid have become widely accepted as a source of available chlorine for use in solid bleaching and detergent compositions. The most popular of these compounds are sodium dichloroisocyanurate and potassium dichloroisocyanurate. These latter compounds have been found especially desirable in solid detergent or bleaching compositions because they are relatively stable under ambient conditions in the absence of substantial amounts of moisture, and are capable of giving off their active chlorine when placed in aqueous solutions intended for bleaching, disinfecting or germicidal action.

One method for preparing these salts, which is commonly practiced by manufacturers, is carried out by simply reacting dichloroisocyanuric acid and either potassium or sodium hydroxide in an aqueous medium. The reaction is carried out at temperatures of from about 5° C. to about 65° C. and the reaction mixture is maintained at a pH of from about 6 to about 7. The reactants normally are in about stoichiometric proportions within this pH range and are in the form of an aqueous slurry containing up to about 50% solids. After termination of the reaction, the resultant slurry is treated in separatory equipment to remove the solids from the mother liquor (i.e., the filter or centrifuge effluent). The solids, which are composed of dichloroisocyanuric acid salt crystals, are dried to remove both uncombined and combined water, to a substantially anhydrous product. It is preferred to maintain the water content of the resultant product, either as combined or uncombined water, as low as possible (e.g., 0.2% by wt. $H_2O$) since storage stability of the final product decreases rapidly in the presence of moisture. In addition, formulators prefer to use the anhydrous form of these dichloroisocyanuric acid salt products for ease of handling and for incorporation in bleaching and sanitizing formulations.

A serious difficulty which has arisen in the manufacture of these dichloroisocyanuric acid salt products in large scale production is the wide range of thermal stability of the products during drying. Thermal stability of the instant products is important because they normally are dried in a gas stream maintained at elevated temperatures to remove all but negligible amounts of moisture without reducing their active chlorine contents. If the products do not have good thermal stability, a sizable portion may be lost by decomposition during drying and can result in a plant shutdown to remove the decomposed salts and to prevent additional quantities of product from decomposing during the drying operation. For example, a thermally unstable cake of potassium dichloroisocyanurate will decompose when drying of this product is attempted by heating the salt to temperatures somewhat above 95° C. A thermally stable potassium dichloroisocyanurate, by contrast, can be heated to temperatures as high as 140° C. without material decomposition.

An added factor which aggravates this situation is that one batch of dichloroisocyanuric acid salt product will vary in its thermal stability from another batch even though both are produced under almost identical conditions. The variation in the thermal stability of different batches of the final product necessitates changing the plant procedure required for drying the product. This presents serious production problems, particularly in continuous processing which requires a product having a consistently high thermal stability so that an established plant drying procedure can be maintained throughout the production cycle.

With respect to the variation in thermal stability of the dichloroisocyanuric acid salt products produced by the above procedure, it has been noted that the initial product which is obtained at the start-up of plant runs has been found to have good thermal stability—essentially like that obtained in laboratory operations. However, after the plant has been in operation intermittently, the thermal stability of the resultant product commences to decrease and finally reaches a low. Heretofore, it has not been determined what affected the thermal stability of the dichloroisocyanuric acid salt product because the reaction variables, i.e., the temperature, duration of reaction, pH values, purity of reagents, etc., all were maintained exactly the same.

As a result, there is a need for a method of producing salts of dichloroisocyanuric acid which are thermally stable and which have a constant and uniform thermal stability.

It is an object of the present invention to produce dry salts of dichloroisocyanuric acid which have a relatively high thermal stability and which can be dried to very low moisture contents without thermal decomposition.

These and other objects will become apparent from the following disclosure.

We have now found that the poor thermal stability of salts of dichloroisocyanuric acid produced on a plant scale is due to the presence of some impurity in the mother liquor which is used as the reaction medium in making up the reaction slurry; the mother liquor normally is an effluent stream recovered from a previous reaction slurry.

We have further found that salts of dichloroisocyanuric acid having a uniformly high thermal stability can be produced by chlorinating the recycled mother liquor which is used as the reaction medium when reacting dichloroisocyanuric acid with either potassium hydroxide or sodium hydroxide at a pH of from about 6 to about 7 to produce the dichloroisocyanuric acid salt product. The amount of chlorine equivalent which is added is that which is required to bring the pH of the mother liquor down to a value of 4 in the absence of any reagents or products (hereinafter this will be termed the "chlorine demand" of the mother liquor). The chlorine may be supplied to the mother liquor either before, during or after the reaction and may be added in the form of gaseous chlorine, alkali metal hypochlorites, trichloroisocyanuric acid, or other active chlorine compounds which liberate active chlorine when placed in the aqueous liquor.

In carrying out the present process, dichloroisocyanuric acid, preferably in the form of an aqueous slurry, is added to a reactor containing recycled mother liquor recovered after crystallization of a previous batch of dichloroisocyanuric acid salt crystals. The recycled mother liquor contains dissolved dichloroisocyanuric acid salt product, the amount depending on the solubility of the salt and the temperature of the solution. Potassium hydroxide or sodium hydroxide is added to the reactor, preferably in the form of aqueous solution, simultaneously with the dichloroisocyanuric acid. The two reagents are added to the reactor in about stoichiometric proportions. The pH of the aqueous slurry is maintained within a range of from about 6.0 to about 7.0 by careful control of the potassium hydroxide or sodium hydroxide feed rate. The reaction slurry is maintained at a temperature of from about 5 to about 65° C. by continuous passage of the slurry through a heat exchanger to remove the heat of reaction. The preferred temperature of operation is from about 20 to about 30° C.

In the preferred embodiment, chlorine or an active chlorine compound is added to the above reaction mixture concurrently with the other reagents. The chlorine can be added in gaseous form or in the form of an aqueous solution. In place of chlorine, active chlorine compounds such as alkali metal hypochlorites, e.g., sodium or potassium hypochlorites, trichloroisocyanuric acid or other chlorine-containing compounds which liberate active chlorine when placed in an aqueous solution can be employed. The amount of chlorine added must be sufficient to satisfy the chlorine demand of the mother liquor as heretofore defined. The amount of chlorine which is required can be determined by a preliminary analysis of the mother liquor which is being returned to the reactor to determine the amount of chlorine required to reduce the pH of the mother liquor (which is normally at a pH of about 7) to a value of about 4 in the absence of any reactants. Once this chlorine demand has been determined, enough chlorine or equivalent amount of active chlorine compound is added to at least satisfy the chlorine demand of the mother liquor. A small excess of added chlorine is desirable to assure adding a sufficient amount, since any small excess of chlorine does not adversely affect the reaction. While the active chlorine may be conveniently added to the reaction slurry along with the dichloroisocyanuric acid and the potassium or sodium hydroxide, it is possible to carry out the chlorination of the mother liquor either prior or subsequent to the formation of the product salt in the reaction slurry.

When adding the chlorine or active chlorine compounds to the reaction mixture, it has normally been found that a compensating amount of potassium or sodium hydroxide reagent must be added, above the amount required as a reactant in the process, to maintain the pH of the reaction mixture between about 6 to about 7. The added alkali metal hydroxide is most conveniently added to the reaction slurry along with the chlorine or active chlorine compound.

In carrying out the above reaction, the pH of the reaction mixture should not be allowed to rise above about 7 because of the possible formation of nitrogen trichloride which is undesirable since it is detonable even in small quantities. The pH of the reaction slurry should also not be permitted to fall below about 6.0 in order to assure complete conversion of the dichloroisocyanuric acid to the desired product. At lower pH values, the final product is often contaminated by unreacted reagents such as dichloroisocyanuric acid. Within the pH range of about 6 to about 7, desirably high yields of pure dichloroisocyanuric acid salt products are obtained with a minimum of undesired side products.

After completion of the above reaction, a slurry is removed from the reactor, cooled to about 20° C. and treated to separate the dichloroisocyanuric acid salt product from the mother liquor. The mother liquor is recycled back to the reactor along with make-up dichloroisocyanuric acid and additional potassium or sodium hydroxide, while the separated dichloroisocyanuric acid salt product is passed to a dryer. There it is contacted with a heated gas stream to remove residual water, either in combined or uncombined form, so that the final dichloroisocyanuric acid salt product contains less than about 0.2% by weight of water.

In carrying out the present reaction in a continuous process, the dichloroisocyanuric acid and the alkaline hydroxide are continuously added to a reactor containing mother liquor. Chlorine treatment is also carried out continuously by adding chlorine along with the other two reagents. A portion of the slurry in the reactor is constantly removed, cooled, and is treated to separate the salt product from its mother liquor. The mother liquor which contains sizable amounts of dissolved salt product is recycled back to the reactor. The separated salt product is rapidly dried using a heated gas stream and then packaged for shipment.

In general, the mother liquor is not discarded in either continuous or batch operations because it contains sizable quantities of dichloroisocyanuric acid salt product which must be recovered for economic operation. The dissolved salt is not lost as long as the mother liquor is constantly recycled in the system.

The above procedure can also be carried out in batch form within the required pH range by reacting batches of dichloroisocyanuric acid and an alkali metal hydroxide together along with chlorine or an active chlorine compound until the reaction has gone to completion and then cooling and filtering the resultant slurry to separate the product salt crystals from the mother liquor. Thereafter, the mother liquor can be used as a heel or reaction medium for carrying out subsequent reaction between dichloroisocyanuric acid and an alkaline hydroxide.

While the above process has been described by the addition of chlorine or active chlorine compounds to the reaction mixture, the present invention can be carried out by adding these ingredients either before, or subsequent to, the formation of the potassium or sodium dichloroisocyanurates in the reaction slurry. In all events, the chlorination should be carried out before separation of the salt product from the mother liquor. Apparently, the chlorination converts the offending impurities into a form in which it does not interfere with the thermal stability of the crystallized salt product.

In order to provide a rapid and standard method of determining the thermal stability of the resultant potassium or sodium dichloroisocyanurates, the following test was devised. In this test, a 5–10 g. sample of the dried product is placed in a test tube and the tube inserted into a molten salt bath which is at a temperature of 275° C. The time required for the sample to commence decomposition in the test tube is a measure of its stability and is termed its "stability time." In the case of potassium dichloroisocyanurate, a thermally stable product begins decomposing in about 120 sec. or more while an unstable product will commence decomposing in from only 30–50 sec. In the case of sodium dichloroisocyanurate, a thermally stable product will not decompose in the salt bath until the passage of at least about 150 sec. while an unstable product begins decomposing in under 100 sec.

When the reaction is carried out using a fresh aqueous reaction medium in the reactor instead of recycled mother liquor, the resulting salt product has good thermal stability even without chlorine treatment. This is essentially what occurs in a plant start-up procedure and the good thermal stability of the product is believed due to the comparative lack of impurities in the aqueous mixture used in the reactor.

It is not known how the present chlorination technique renders offending impurities innocuous. It has been observed however, that stable potassium dichloroisocyanurate crystals are characterized by having a large cross sectional area of about 1500 square microns and a definite rhomboidal structure. By contrast, thermally unstable potassium dichloroisocyanurate has been found to have very fine nondescript crystals having cross sectional areas of only 25 to about 50 square microns. In the case of sodium dichloroisocyanurate, the thermally stable salt has a coarse rod-like crystal structure compared with the fine needle-like crystals of thermally unstable product. Further, the thermally stable sodium dichloroisocyanurate salts can be readily filtered and separated from the mother liquor by virtue of the larger crystal size than the thermally unstable, fine needle-like sodium dichloroisocyanurate crystals.

The following examples are given to illustrate the present invention and are not deemed to be limiting thereof.

Example I

In the preparation of potassium dichloroisocyanurate, 100 lbs. of dichloroisocynuric acid was slurried in 400 lbs. of fresh water and this slurry continually mixed with 57 lbs. of a 50% aqueous potassium hydroxide. The rate of potassium hydroxide addition was controlled so that 1½ hrs. were required to complete the reaction. During the reaction, the mixture was controlled at a pH of 6.5 to 6.8 by careful addition of the potassium hydroxide reagent. The temperature of the reaction mixture was controlled between 20 and 25° C. by cooling the reaction mixture in a water-cooled heat exchanger. The resultant slurry was continually withdrawn and centrifuged to separate the potassium dichloroisocyanurate crystals from an effluent stream of mother liquor. The wet crystals were dried by contact with heated air to less than 0.2% water. The resultant effluent stream was recycled to the reactor where additional potassium hydroxide and dichloroisocyanuric acid were added in the same proportions as previously recited. The resultant dry potassium dichloroisocyanurate crystals were tested for thermal stability by placing a dry 5–10 g. sample in a test tube and inserting the tube into a molten salt bath at a temperature of 275° C. The time required for decomposition to commence was recorded as the stability time.

At the commencement of the above reaction, the initial product that was recovered was found to be crystals having a rhomboidal structure which had a relatively large cross sectional area of about 1500 square microns. The salts had a stability time of 180 sec. when heated in the salt bath as defined above. After continuous operation of the above process, it was shut down for 20 hrs. Operations were then resumed and the mother liquor (effluent stream) was utilized as the heel in subsequent production. The resultant salt product was found to be composed of fine, nondescript shaped crystals having a cross sectional area of 25–50 square microns. The stability time of the resultant potassium dichloroisocyanurate decreased to only 30 sec. when measured by the above salt test.

The product slurry was then treated by adding 15 lbs. of trichloroisocyanuric acid per 100 lbs. of dichloroisocyanuric acid equivalent. The pH of the resulting mixture was adjusted to 6.8 by the addition of KOH. Thereafter, the product crystals were separated from the effluent mother liquor and were found to consist of large rhomboids having a cross sectional area of between 1000 and 1500 square microns. The salt had a stability time in the salt bath of 150 sec.

Example II

*Run A.*—A continuous preparation of potassium dichloroisocyanurate was carried out by feeding a 20 weight percent dichloroisocyanuric acid aqueous slurry into a reactor. Simultaneously, a 50% potassium hydroxide solution was fed to the reactor at a rate sufficient to maintain the pH at 6.8. The aqueous liquor used in making up the dichloroisocyanuric acid slurry was mother liquor from a prior batch centrifuging operation in the production of potassium dichloroisocyanurate, which had been stored for 72 hrs. at 35° C. The resultant potassium dichloroisocyanurate salt precipitate was continually removed as a slurry and centrifuged to separate the salt from the resultant mother liquor. The mother liquor was returned to the reactor as a make-up reaction medium. The product salt was found to be composed of very fine crystals having a cross sectional area of below 50 square microns. The crystals had a stability time of only 30 sec. when measured in a salt bath as set forth in Example I.

*Run B.*—The process set forth in Run A was repeated except that chlorine gas was added to the reactor at a rate equivalent to 15 parts of chlorine to 100 parts of dichloroisocyanuric acid equivalent. After continuous chlorine addition, a product was separated from the mother liquor and found to be potassium dichloroisocyanurate in the form of large rhomboid crystals having a cross sectional area of 1400 square microns. The salt had a stability time of 134 sec. when tested as set forth in Example I.

Example III

A slurry similar to Example II, Run A, which yielded thermally unstable potassium dichloroisocyanurate product was treated batchwise with a 20% aqueous solution of potassium oxychloride (KOCl) equivalent to 17 parts of KOCl per 100 parts of dichloroisocyanuric acid equivalent. The slurry was then followed by pH adjustment to 6.8. The resultant potassium dichloroisocyanurate product that was separated was dried and then tested for its stability time in a salt bath at 275° C. as set forth in Example I. It was found to have a stability time of 150 sec.

Example IV

*Run A.*—The process of Example I was repeated except that stoichiometric amounts of 50% sodium hydroxide solution were used in place of the potassium hydroxide employed in Example I. After continuous recycle of the mother liquor, the sodium dichloroisocyanurate product was found to be composed of fine needle-like structures whose crystals filtered very poorly and which decomposed during the normal drying operation. These salts, when tested in the molten salt bath, had a stability time of 80 sec.

*Run B.*—The above slurry was treated continuously with 5 lbs. of gaseous chlorine per 100 lbs. of dichloroisocyanuric acid fed to the reactor. After continuous operation, the resultant product was found to be sodium dichloroisocyanurate salt having a coarse rod-like crystal which filtered readily from the mother liquor. This product was found to dry readily without thermal decomposition and when tested for thermal stability as set forth in Example I, was found to have a stability time of 165 sec.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. In the process of producing a salt of dichloroisocyanuric acid selected from the group consisting of sodium dichloroisocyanurate and potassium dichloroisocyanurate wherein dichloroisocyanuric acid and an alkali metal hydroxide selected from the group consisting of sodium hydroxide and potassium hydroxide are reacted together as a slurry in an aqueous medium maintained at a pH of from about 6 to about 7 and at a temperature of from about 5 to about 65° C. to produce a dichloroisocyanuric acid salt product, the reaction mixture is separated into a substantially solid product stream and a substantially liquid effluent stream, said liquid effluent stream is recycled for use as an aqueous reaction medium in the make-up of additional slurries of said dichloroisocyanuric acid and an alkali metal hydroxide, and said solid product stream is dried to obtain said dichloroisocyanuric acid salt product in a substantially anhydrous state, the improvement which comprises chlorinating said aqueous reaction medium with an equivalent amount of chlorine required to bring the pH of said aqueous reaction medium down to a value of 4 in the absence of any added reactants, whereby said aqueous reaction medium is freed of impurities which affect the thermal stability of the dichloroisocyanuric acid salt crystals produced therein, and recovering from said reaction mixture a dichloroisocyanuric acid salt product having a high thermal stability.

2. Process of claim 1 wherein said salt is potassium dichloroisocyanurate and said alkali metal hydroxide is potassium hydroxide.

3. Process of claim 1 wherein said salt is sodium dichloroisocyanurate and said alkali metal hydroxide is sodium hydroxide.

4. Process of claim 1 wherein the temperature of the reaction is from about 20–30° C.

5. Process of claim 1 wherein chlorination of the liquid effluent stream is carried out using chlorine gas.

6. Process of claim 1 wherein chlorination of the liquid effluent stream is carried out using potassium hypochlorite.

7. Process of claim 1 wherein chlorination of the liquid effluent stream is carried out using sodium hypochlorite.

8. Process of claim 1 wherein chlorination of the liquid effluent stream is carried out using trichloroisocyanuric acid.

9. Process of claim 1 wherein the chlorination of said aqueous reaction medium is carried out by adding chlorine to said liquid effluent stream prior to the recycling of said liquid effluent stream for use as an aqueous reaction medium.

10. Process of claim 1 wherein said chlorination is carried out in said aqueous reaction medium during the reaction of said dichloroisocyanuric acid and said alkali metal hydroxide.

11. Process of claim 1 wherein said chlorination of said aqueous reaction medium is carried out after production of said dichloroisocyanuric acid salt product but prior to the separation of said dichloroisocyanuric acid salt product from said aqueous reaction medium.

References Cited by the Examiner
UNITED STATES PATENTS

| | | | |
|---|---|---|---|
| 2,913,460 | 11/1959 | Brown et al. | 260—248 |
| 3,035,054 | 5/1962 | Symes et al. | 260—248 |
| 3,035,057 | 5/1962 | Symes et al. | 260—248 |

WALTER A. MODANCE, *Primary Examiner.*

JOHN M. FORD, *Assistant Examiner.*